US005789962A

United States Patent [19]

Shou et al.

[11] Patent Number: 5,789,962

[45] Date of Patent: Aug. 4, 1998

[54] MULTIPLICATION CIRCUIT

[75] Inventors: Guoliang Shou; Kazunori Motohashi; Jian Luo; Sunao Takatori; Makoto Yamamoto, all of Tokyo, Japan

[73] Assignees: Yozan Inc., Tokyo; Sharp Kabushiki Kaisha, Osaka, both of Japan

[21] Appl. No.: 638,330

[22] Filed: Apr. 26, 1996

[30] Foreign Application Priority Data

Apr. 26, 1995 [JP] Japan .................................... 7-125700
May 30, 1995 [JP] Japan .................................... 7-155297

[51] Int. Cl.[6] .................................................. G06F 7/44

[52] U.S. Cl. ............................................ 327/356; 327/358

[58] Field of Search .................................. 327/356, 358, 327/334, 115–119, 122, 337, 554; 364/703; 375/353

[56] References Cited

U.S. PATENT DOCUMENTS 4,517,655 5/1985 Claasen et al. ........................ 364/703
4,616,185 10/1986 van Roermund ........................ 327/356
4,716,375 12/1987 van Roermund ........................ 327/356
5,416,370 5/1995 Takatori et al. ........................ 327/356
5,457,417 10/1995 Shou et al. ............................ 327/356

FOREIGN PATENT DOCUMENTS 6-195483 of 0000 Japan .

*Primary Examiner*—Toan Tran
*Attorney, Agent, or Firm*—Cushman, Darby & Cushman IP group of Pillsbury Madison & Sutro LLP

[57] ABSTRACT

A multiplication circuit has two capacitive couplings connected first and second inverting amplifiers, respectively. Two steps of multiplication are performed by this circuit. Input is multiplied by a multiplier of a product of multipliers of the successive multiplication circuits, so the total multiplier can be rather large with similar capacitances to that of the conventional circuit.

9 Claims, 5 Drawing Sheets

MULTIPLICATION CIRCUIT

FIELD OF THE INVENTION

The present invention relates to a multiplication circuit, and in particular to a multiplication circuit for performing direct multiplication of analog inputs and digital inputs.

BACKGROUND OF THE INVENTION

A multiplication circuit to multiply an analog input voltage by a digital multiplier is disclosed in Japanese patent publication numbered 06-195483. In the multiplier, the input voltage is connected to a capacitive coupling consisting of a plurality of parallel capacitances which are selectively connected to the input voltage by switches for weighting of the input voltage. On the output side of the capacitive coupling, two stages of inverting amplifying portions in which feedback capacitances are connected to a serial MOS inverters are connected so that the linear characteristics of the output is guaranteed.

However, this multiplication circuit has a problem in that a large capacitance is necessary when a large multiplier is settled and the area of the circuit becomes large because the weighting is performed only by the capacitances of the capacitive coupling.

Also, with respect to a computer using the multiplication circuit above, the coordination of the input range and the output range maybe broken when the operation route is complicated. Therefore, the range should be positively adjusted. The applicant proposes a scaler circuit for adjusting the input and output range for the multiplication circuit in Japanese patent publication numbered 06-232650.

In the proposed circuit, input voltage Vin is connected through switch circuit SWC1 to a capacitive coupling CP1, whose output is input to an inverting amplifying portion INV1 as shown in FIG. 6. The output of INV1 is input to a group CF1 of parallel feedback capacitances, whose output is connected to the input side of INV1 by switch circuit SWC2. Switch circuit SWC1 connects C1 to C4 of the capacitances of CP1 to Vin or a reference voltage, and switch circuit SWC2 connects the output of INV1 to C5 to C8 of the capacitances of CF1 or the reference voltage. In this structure, when the total capacity of the capacitances connected to Vin by SWC1 ("effective composit capacity", hereinafter) are represented by Σ C1i, and the effective composit capacity of CP2 to be Σ C2i, the output V' of INV1 can expressed by the formula (1).

$$V' = -Vin \cdot \frac{\Sigma C1i}{\Sigma C2i} \tag{1}$$

The output of INV1 is connected to a similar inverting amplifying portion INV2, through switch circuit SWC3 and capacitive coupling CP2 (consisting of C9, C10, C11 and C12). The input of INV2 is connected to its output through feedback capacitance group CP2 and switch circuit SWC4. Representing an output of INV1 by V', Vout of the output of INV2 can be expressed as in formula (2) in the same way above.

$$Vout = -V' \cdot \frac{\Sigma C3i}{\Sigma C4i} \tag{2}$$

The output level is controlled by these weighting of formulas (1) and (2).

The offset voltage is set off by setting SWC2 to SWC4 so that the effective composit capacities of CP2, CP3 and CP4 are the same, and by setting that (C1+C2+C3+C4) is equal to (C9+C10+C11+C12).

The multiplier of the scaler circuit is defined according to the capacity of the capacitance. There was a problem in that the circuit area becomes large because a capacitance is formed by connecting a plurality of unit capacitances on an LSI, therefore, a large number of unit capacitances was necessary in order to realize a large multiplier. When there is a difference between input offset voltage and reference voltage, a large offset constituent arises and the performance of the circuit is deteriorated. Therefore, it was necessary to control the offset constituent of the output by finely adjusting the capacity of the capacitance.

SUMMARY OF THE INVENTION

An object of the present invention is to solve the above conventional problems and to provide a multiplication circuit with less unit capacitances, and consequently, the circuit area can be reduced.

In a multiplication circuit of the present invention, capacitive couplings are connected to the first and the second inverting amplifying portion, respectively, and the capacitances of the capacitive couplings are selectively connected by switches. Two steps of multiplication are realized by almost the same size of conventional circuit.

In the scaler circuit of the present invention, 1)an odd number of MOS inverters are connected in serial, 2) a grounded capacitance is connected between an output of the last stage of the MOS inverters and the ground, 3) an output of the MOS inverters is connected to a supply voltage and the ground by a pair of balancing resistances, respectively, in the stage preceding the last stage of the MOS inverter, 4) a reference voltage is generated as an output of a reference voltage generating circuit, which consists of an odd number of MOS inverters serially connected, an output of the last stage MOS inverter being fed back to an input of the first stage inverter, and 5) the MOS inverter of the reference voltage generating circuit and the MOS inverter of the first and the second inverting amplifying portions are settled on the same circuit characteristics as well as adjacently placed on a LSI. The structure of the reference voltage generating circuit and the inverter circuit are equivalent, and the difference between input offset voltage and reference voltage are diminished so that capacitances can be flexibly designed.

According to the multiplication circuit of the present invention, the capacity of the capacitance for each multiplier can be reduced because the product of multipliers of the successive multiplication circuits can be deemed as one multiplier.

According to the scaler circuit of the present invention, the accuracy of the output is improved because the number of the unit capacitances is controlled due to the two stages of weighting and controlling the capacity of the first inverting amplifying portion and the second inverting amplifying portion, and the offset voltage of the MOS inverters of the reference voltage generating circuit and the inverting amplifying portion are canceled out. Also, the flexibility of design of capacity of the capacitances is surely obtained.

PREFERRED EMBODIMENT OF THE PRESENT INVENTION

Hereinafter, the first embodiment of a multiplication circuit according to the present invention is described with reference to the drawings.

Figure 1:
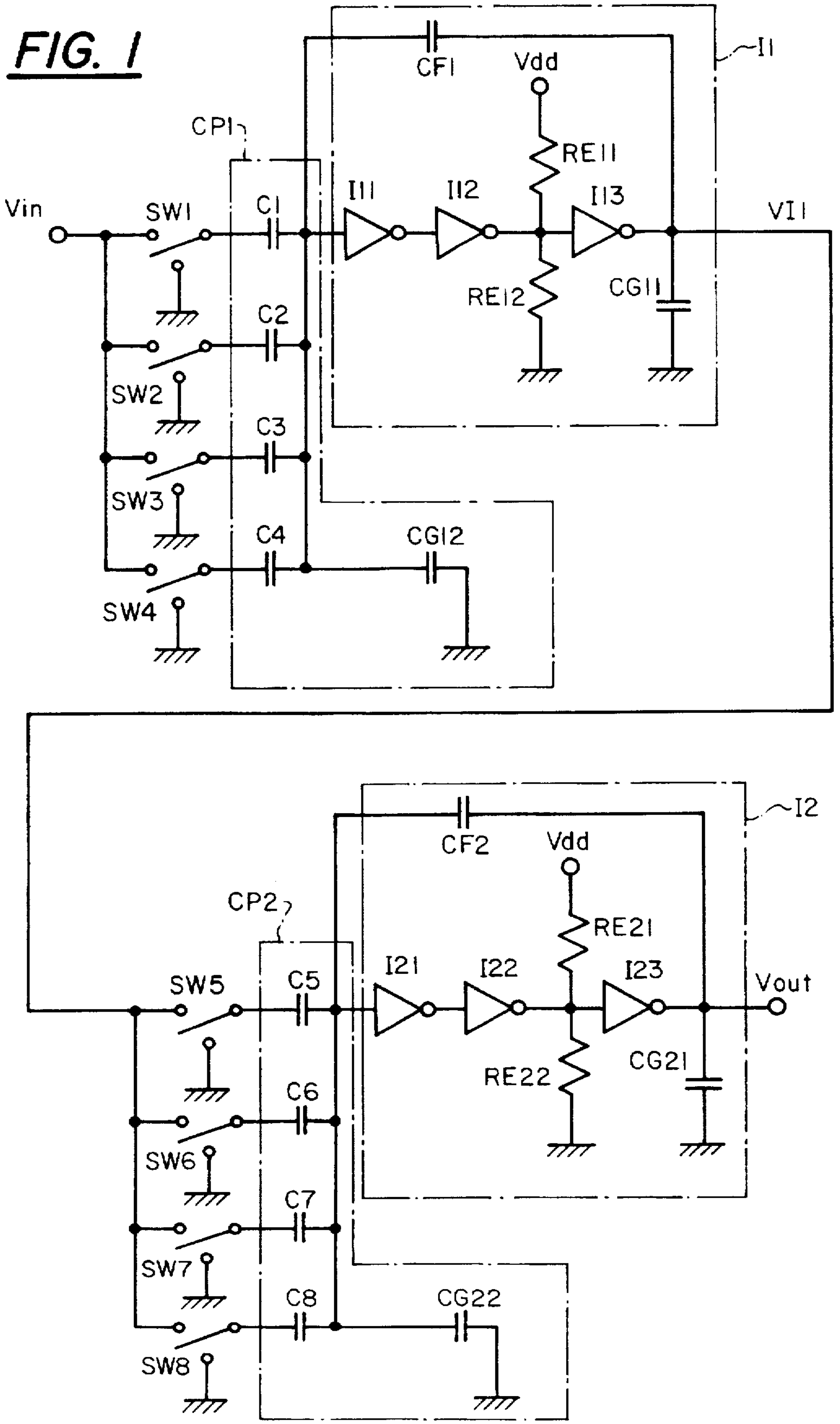
FIG. 1 shows a circuit of the first embodiment of the multiplication circuit of the present invention.

In FIG. 1, the circuit includes a switch circuit having a plurality of switches of SW1, SW2, SW3 and SW4 parallelly connected to an input voltage. An output of the switch circuit is input to a capacitive coupling CP1 including a plurality of capacitances C1, C2, C3 and C4. That is, the outputs of each switch SW1, SW2, SW3 and SW4 is connected to capacitances C1, C2, C3 and C4, respectively. The capacitances are selectively connected by the switches to the input voltage. The inputs of switches SW1 to SW4 are alternatively connected to the input voltage or the ground, so Vin or 0V is impressed on the capacitances.

An output of the capacitive coupling CP1 is input to an inverting amplifying portion I1. The voltage output by capacitive coupling CP1 is transmitted to the next stage with good linearity and driving ability.

Inverting amplifying portion I1 consists of three stages of MOS inverters I11, I12 and I13, serially connected. An output of MOS inverter I13 on the last stage is fed back to an input of I1 by a feedback capacitance CF1. The serial circuit of MOS inverters has a gain. The input and output becomes coincident by feeding back the output to the input, consequently, it is possible to stably provide the inverted output of an input independently from the load of circuits on the next stage.

The output of MOS inverter I13 is connected to ground via a grounded capacitance CG11. The output of MOS inverter I12 is connected to resistances RE11 and RE12. RE11 connects a supply voltage Vdd to the output of I12 and RE12 connects the output of I12to the ground.

These resistances RE11 and RE12 form a balancing resistance in pairs and contribute to prevent unstable oscillation.

The output of inverting amplifying portion I1 is input to a switch circuit consisting of a plurality of switches SW5, SW6, SW7 and SW8. The output of the inverting amplifying portion is connected to each switch in the switch circuit. An output of the switch circuit is input to a capacitive coupling CP2 consisting of a plurality of capacitances C5, C6, C7 and C8. That is, the outputs of switches SW5, SW6, SW7 and SW8 are connected to capacitances C5, C6, C7 and C8, respectively. The capacitances are selectively connected by switches to the output of the inverting amplifying portion I1.

The output of capacitive coupling CP2 is input to an inverting amplifying portion I2. The voltage output by capacitive coupling CP2 is transmitted to the next stage with good linearity and driving ability.

In inverting amplifying portion I2, three stages of MOS inverters I21, I22 and I23 are connected in series. An output of the last stage of MOS inverter I23 is fed back to an input of I2 by a feedback capacitance CF2. Accordingly, the input of CP2 can be inverted and output with good linearity and driving ability similarly to I1.

Also, in inverting amplifying portion I2, grounded capacitance CG21, balancing resistance RE21 and RE22 are connected as in I1, which prevent unstable oscillation.

To the capacitive coupling CP1, a grounded capacitance CG12 is connected parallel with C1 to C4, an input of which is connected to the ground instead of Vin. To the capacitive coupling CP2, a grounded capacitance CG22 is connected parallel with C5 to C8, an input of which is connected to the ground instead of the output of I1.

If all switches SW1 to SW8 are closed, the output V1 of I1 is expressed as formula (3). When an offset voltage Vb caused at the connecting points of CG12 and CG22 by voltages V' input at these capacitances, $$Vb = \frac{CG12 \cdot V'}{CF1} = \frac{CG22 \cdot V'}{CF2}, \text{ and}$$

$$VI1 = Vb = \frac{-Vin(C1 + C2 + C3 + C4)}{CF1} \tag{3}$$

On the other hand, Vout of the output of I2 is as in the formula (4).

$$Vout + Vb = \frac{-VI1(C5 + C6 + C7 + C8)}{CF2} \tag{4}$$

The formulas (3) and (4) can be combined as the formula (5). In this combination, Vb can be deleted because it is usually designated that $$\frac{(C1 + C2 + C3 + C4)}{CF1} = \frac{(C5 + C6 + C7 + C8)}{CF2} = 1.$$

$$Vout = \frac{-Vin(C1 + C2 + C3 + C4)(C5 + C6 + C7 + C8)}{CF1 \cdot CF2} \tag{5}$$

Here, the effective composite capacity of the capacitances connected by switches is expressed by Σ C1i with respect to C1 to C4, and Σ C2i with respect to C5 to C8, so that a general multiplication can be defined. For example SW1, SW3 and SW6 are closed, Σ C1i and Σ C2i are as in formulas (6) and (7), respectively.

$$\Sigma C1i = C1 + C3 \tag{6}$$

$$\Sigma C2i = C6 \tag{7}$$

According to the generalization above, the multiplication can be expressed by formula (8).

$$Vout = \frac{-Vin(\Sigma C1i \cdot \Sigma C2i)}{CF1 \cdot CF2} \tag{8}$$

As can be seen from formula (8), the capacity of the capacitances can be prevented from being large and multiplication of large multipliers can be performed.

The ratio of the capacities is settled as C1:C2:C3:C4=1:2:4:8. The multiplication with a binary multiplier can be performed by settling the effective composite capacity. The capacitance C5 to C8 are similarly set.

Grounded capacitances CG12 and CG22 are effective to control the maximum value of the multiplier and the linearity of the outputs can be improved. For example, the ratios are C1:C2:C3:C4:CG12:CF1=1:2:4:8:1:16 and C5:C6:C7:C8:CG22:CF2=1:2:4:8:1:16, the maximum of the output is limited to be (15/16)×(15/16). As designing of the multiplier becomes easier when such grounded capacitances are omitted, there is a case to omit them in the actual circuit.

Next, the second embodiment of scaler circuit as an application of the multiplication circuit is described with reference to the attached drawings.

Figure 2:
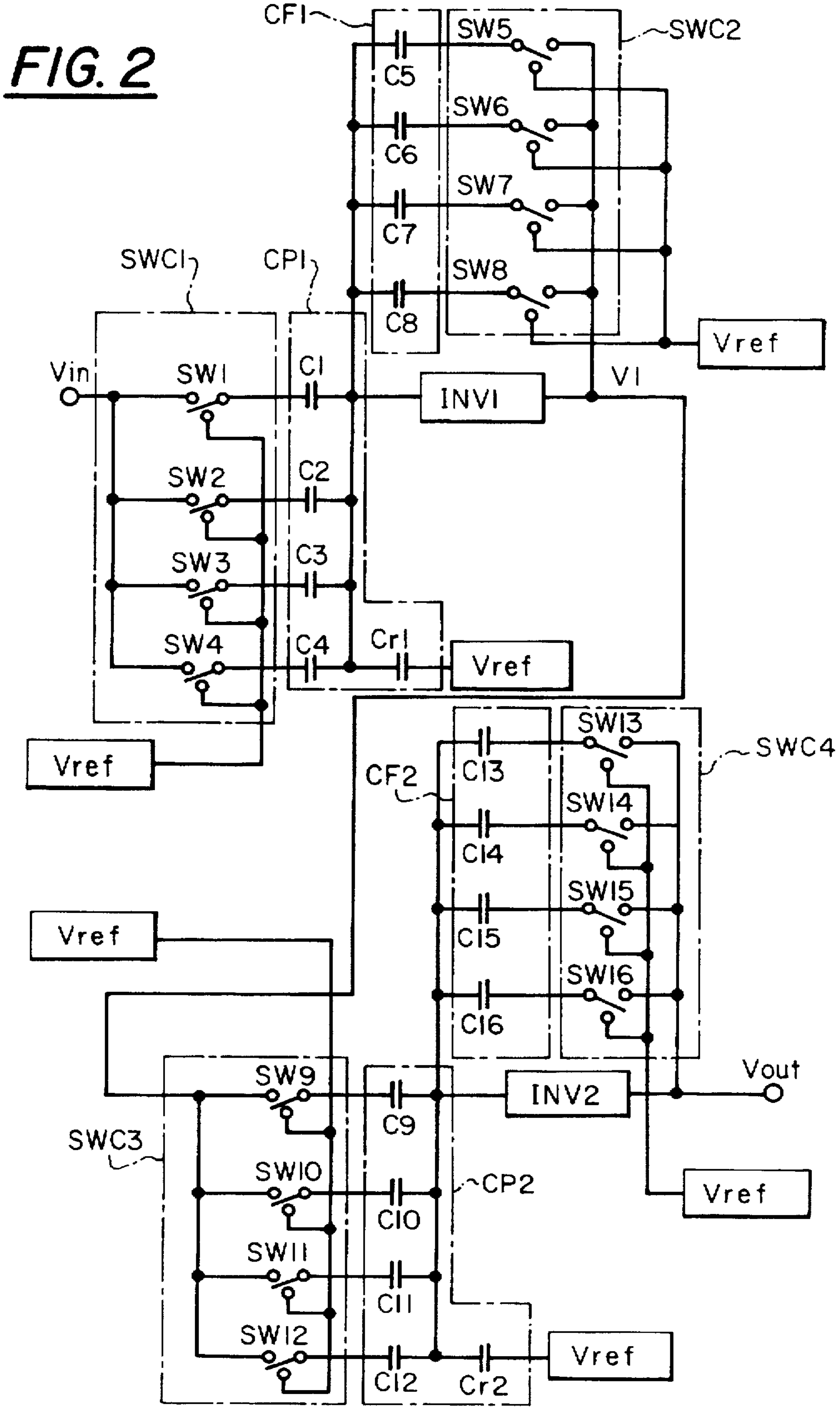
FIG. 2 shows a circuit of the second embodiment as the scaler circuit.

In FIG. 2, the scaler circuit consists of a switch circuit SWC1, capacitive coupling CP1, inverting amplifying portion INV1, switch circuit SWC3, capacitive coupling CP2 and inverting amplifying portion INV2, connected in serial. An input voltage Vin is connected to the switch circuit SWC1.

Switch circuit SWC1 includes a plurality of switches SW1, SW2, SW3 and SW4 for alternatively connecting Vin or a reference voltage to its output. The reference voltage is generated by a reference voltage generating circuit Vref, and the half voltage of the common supply voltage Vdd, that is $$\frac{Vdd}{2}$$

is generated in the whole circuit. Capacitive coupling CP1 is structured by integrating the outputs of capacitances C1, C2, C3 and C4, which are connected to switches SW1 to SW4, respectively. The output of CP1 is input to INV1. Switch circuit SWC1 alternatively impresses Vin or the reference voltage to each capacitance of capacitive coupling CP1, and the integrated outputs are input to INV1.

To the output of inverting amplifying portion INV1, a switch circuit SWC2 is connected, which consists of a plurality of switches SW5, SW6, SW7 and SW8 connected to INV1 in parallel. To SWC2, a group CF1 of feedback capacitances is connected, which consists of a plurality of capacitances C5, C6, C7 and C8 connected to SWC2 in parallel. The outputs of C5 to C8 are integrated and connected to the input of INV1, and each switches from SW5 to SW8 alternatively connects the output of INV1 or the ground to the corresponding capacitances among C5 to C8, respectively.

To the capacitive coupling CP1, reference voltage capacitance Cr1 is connected parallelly to capacitances from C1 to C4. To Cr1, a reference voltage generating circuit Vref is constantly connected. A reference voltage capacitance similar to Cr1 is used in another multiplication circuit, and these capacitances are effective for equivalence of the multiplication circuits and common use of the circuit pattern.

Reference voltage generating circuit Vref and inverting amplifying portion INV1 are described in detail later. These circuits mainly have the component of three stages of serial MOS inverters, and there is a possibility that offset voltage Voff is included in the reference voltage and input of INV1. Therefore, the MOS inverters in the reference voltage generating circuit and in inverting amplifying portion are designated to have same characteristics, and they are adjacently placed on the LSI. Consequently, the offset voltage of each MOS inverter becomes equal to one another so that offset voltages are canceled off in capacitive couplings CP1, CP2 and feedback capacitance group, as mentioned later.

To the output of the inverting amplifying portion INV1, a switch circuit SWC2 is connected, which consists of a plurality of switches of SW5, SW6, SW7 and SW8 parallelly connected to INV1. To SWC2, a feedback capacitance group CF1 is connected, which consist of a plurality of capacitances C5, C6, C7 and C8, parallelly connects to SWC2. The output of C5 to C8 are integrated and connected to the input of INV1, and switches from SW5 to SW8 alternatively connect the output of INV1 or the reference voltage to the corresponding capacitance among C5 to C8, respectively.

Here, the sum of the capacity of the capacitances connected to Vin among C1 to C4 is defined as the effective composite capacity of CP1 and expressed by Σ(CP1), and the sum of the capacity of the capacitances connect to the output of INV1 in feedback capacitance group CF1 is defined as effective composite capacity and expressed by Σ(CF1). The total sum of the capacities of C1 to C4 is expressed by T(CP1) and the total sum of the capacity of C5 to C8 is expressed by T(CF1). Further, formulas (9) and (10) are assumed to be true.

$$T(CP1)-\Sigma(CP1)=S(CP1) \tag{9}$$

$$T(CF1)-\Sigma(CF1)=S(CF1) \tag{10}$$

In the structure above, expressing an output of INV1 to be V1, offset voltage in the input side of INV1 to be Voff and the reference voltage Vref, formula (11) is true.

$$\Sigma(CP1)(Vin-Voff)+\Sigma(CF1)(V1-Voff)+S(CP1)(Vref-Voff)+S(CF1)(Vref-Voff)=0 \tag{11}$$

from formula (11), formula (12) can be obtained.

$$V1-Voff=-\frac{\Sigma CP1}{\Sigma CF1}\cdot(Vin-Voff)-\frac{S(CP1)+S(CF1)}{\Sigma CF1}\cdot(Vref-Voff) \tag{12}$$

As (Vref−Voff) is extremely small (0.1 mV order), formula (12) is substantially the same as formula (13).

$$V1-Voff=-\frac{\Sigma CP1}{\Sigma CF1}\cdot(Vin-Voff) \tag{13}$$

Switch circuit SWC3 consists of a plurality of switches SW9, SW10, SW11 and SW12 connected in parallel and the capacitive coupling CP2 consists of parallel capacitances C9, C10, C11, C12 and Cr2. Each switch from SW9 to SW12 are connected to corresponding capacitance among C9 to C12, and the output of INV1 or the ground is alternatively connected to the corresponding capacitance. Cr2 is the equivalent reference voltage capacitance as the above Cr1 and is connected to reference voltage generation circuit Vref.

Switch circuit SWC3 alternatively impresses Vin or the ground on each capacitance of the capacitive coupling CP2. The integrated output is input to INV2.

To the output of inverting amplifying portion INV2, a switch circuit SWC4 is connected, which consists of a plurality of switches SW13, SW14, SW15 and SW16 connected in parallel. To SWC4, a feedback capacitance group CF2 is connected, which consist of a plurality of capacitances C13, C14, C15 and C16 connected in parallel. The outputs of switches SW13 to SW16 are integrated and input to the input of INV2, and each switch SW13 to SW16 alternatively connects the output of INV2 or the ground to the corresponding capacitance among C13 to C16.

Here, the sum of the capacity of the capacitances connected to V1 among C9 to C12 is called the effective composite capacity of CP2 and expressed by Σ(CP2), and the sum of the capacity of the capacitances connect to the output of INV2 in feedback capacitance group CF2 is called effective composite capacity and expressed by Σ(CF2). The total sum of the capacities of C9 to C12 is expressed by T(CP2) and the total sum of the capacity of C13 to C16 is expressed by T(CF2). Further, formulas (14) and (15) are assumed to be true.

$$T(CP2)-\Sigma(CP2)=S(CP2) \tag{14}$$

$$T(CF2)-\Sigma(CF2)=S(CF2) \tag{15}$$

In the structure above, expressing the output of INV2 to be Vout, offset voltage in the input side of INV2 to be Voff equal to the offset voltage of the input side of INV1, and the reference voltage Vref, the formula (16) is true.

$$\Sigma(CP2)(V1-Voff)+\Sigma(CF2)(Vout-Voff)+S(CP2)(Vref-Voff)+S(CF2)(Vref-Voff)=0 \tag{16}$$

Formula (16) can be simplified as the following formula (17) by ignoring (Vref−Voff) in the same way as in formula (13).

$$V_{out}-Voff=-\frac{\Sigma CP2}{\Sigma CF2}\cdot(V1-Voff) \quad (17)$$

From formula (13) and (17), formula (18) can be obtained.

$$Vout-Voff=-\frac{\Sigma CP1}{\Sigma CF1}\cdot\frac{\Sigma CP2}{\Sigma CF2}(Vin-Voff) \quad (18)$$

In formula (18), two multipliers of $$\frac{\Sigma CP1}{\Sigma CF1} \text{ and } \frac{\Sigma CP2}{\Sigma CF2}$$

are multiplied to (Vin−Voff). Therefore, a result can be obtained of a multiplication by multiplier to (Vin−Voff), with limiting each multiplier to be small.

Since the offset voltage Voff can be estimated in advance, it is sufficiently possible to adjust the output level by using scaler circuit considering the Voff.

Figure 3:
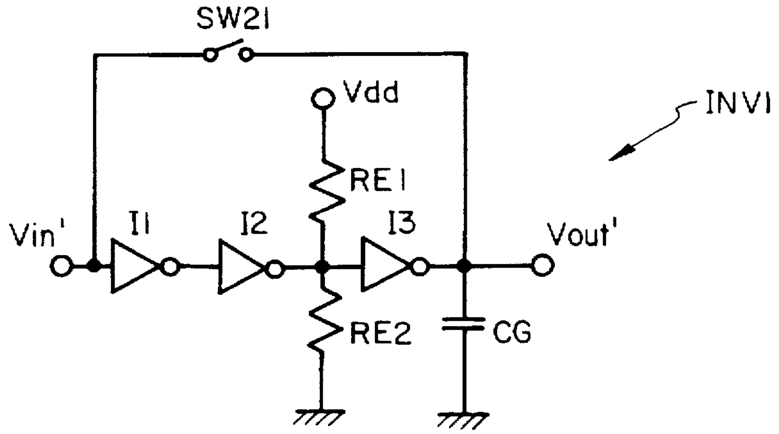
FIG. 3 shows a circuit of the inverting amplifying portion in the second embodiment.

In FIG. 3, inverting amplifying portion INV1 consists of three stages of serial MOS inverters I1, I2 and I3 and a high gain given by the product of gains of these inverters. The output of INV1 is fed back to its input by the above feedback capacitance group CF1, and good linearity in the relationship between input and output is guaranteed. Though an unstable oscillation sometimes occurs when inverted amplified signal of high gain is fed back, it can be prevented by connecting capacitance CG connected to ground to the output of MOS inverter I3 in the last stage, and by connecting balancing resistances RE1 and RE2 to the supply and reference voltages Vdd and ground, respectively. To inverting amplifying portion INV1, a refresh switch SW21 for short-circuiting the input and output is connected. The offset voltage on the input side of inverting amplifying portion is canceled by timely closing refresh switch 21 and at the same time connecting switches from SW1 to SW4 and from SW9 to SW12 to Vref. As inverting amplifying portion INV2 is the same structure as that of INV1, the description is omitted.

Figure 4:
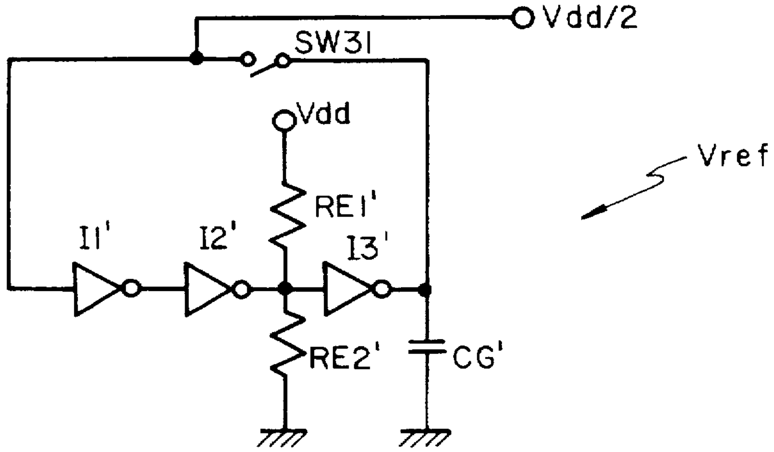
FIG. 4 shows a diagram of the reference voltage generating circuit in the second embodiment.

In FIG. 4, reference voltage generating circuit Vref includes MOS inverters I1', I2' and I3', an output of the last inverter is fed back to an input of the first inverter. Closed dummy switch (never opened) SW31 is placed on the feedback line. Consequently, the circuit pattern of the reference voltage generating circuit can be structured in the same way as inverting amplifying portion INV1 above (including switches), and the electric characteristics especially the offset voltage is equivalent thereto. Moreover, the reference voltage generating circuit is processed to prevent the unstable oscillation by capacitance CG' and balancing resistances RE1' and RE2' similarly to the inverting amplifying portion INV1. When the characteristics of input and output of three stages of the whole inverters are expressed as y=f(x) assuming input is x and output is y, x=f(x) is true according to the relationship of x=y by connecting the output to the input. The characteristics of each MOS inverter, especially the threshold is settled so as to obtain x=Vdd/2 which is to be the solution of x=f(x).

The reference voltage determined in such a way is theoretically the same as that of offset voltage Voff above. The difference between them can be ignored as a small error.

Figure 5:
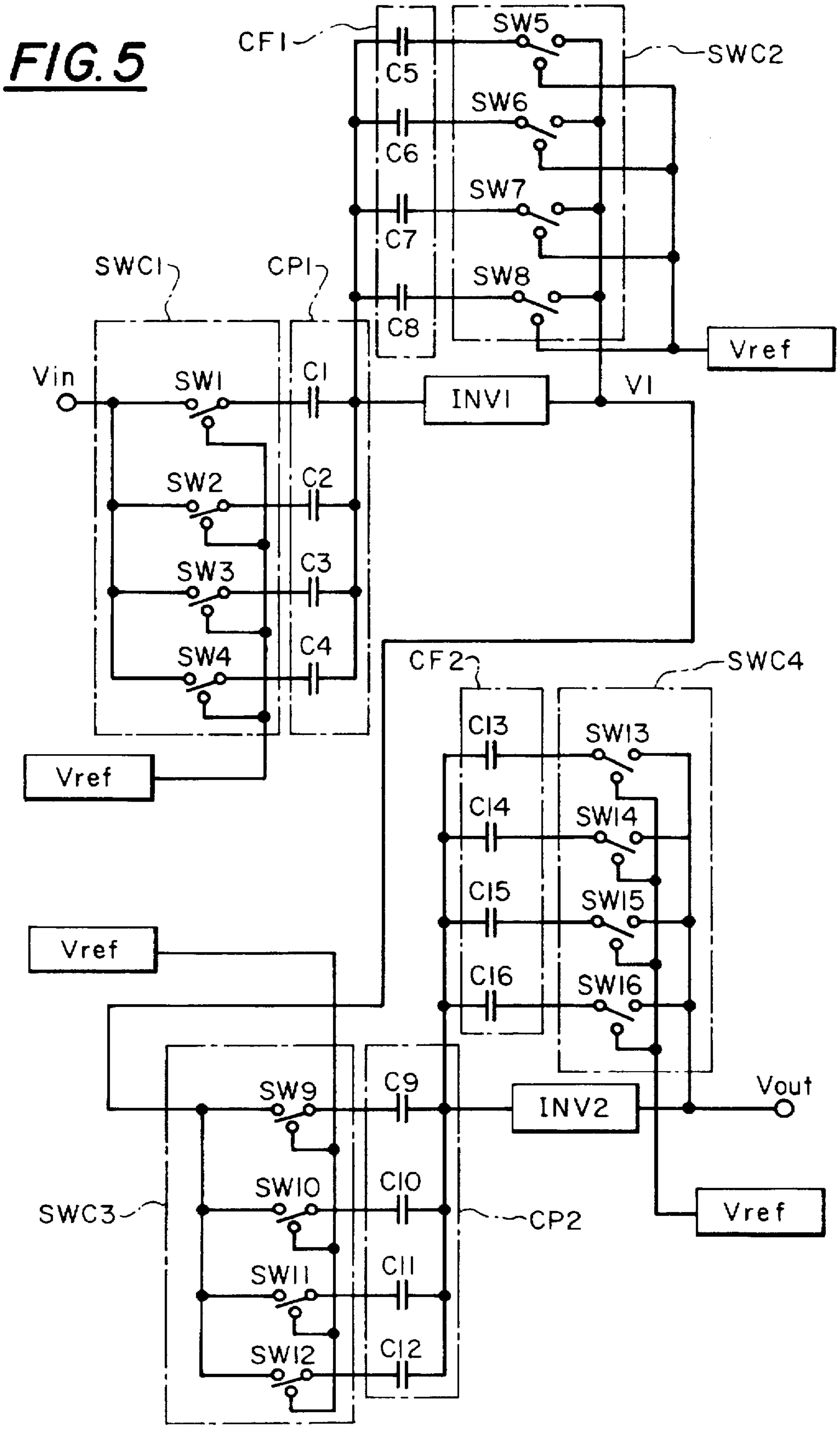
FIG. 5 shows a variation of the second embodiment.
Figure 6:
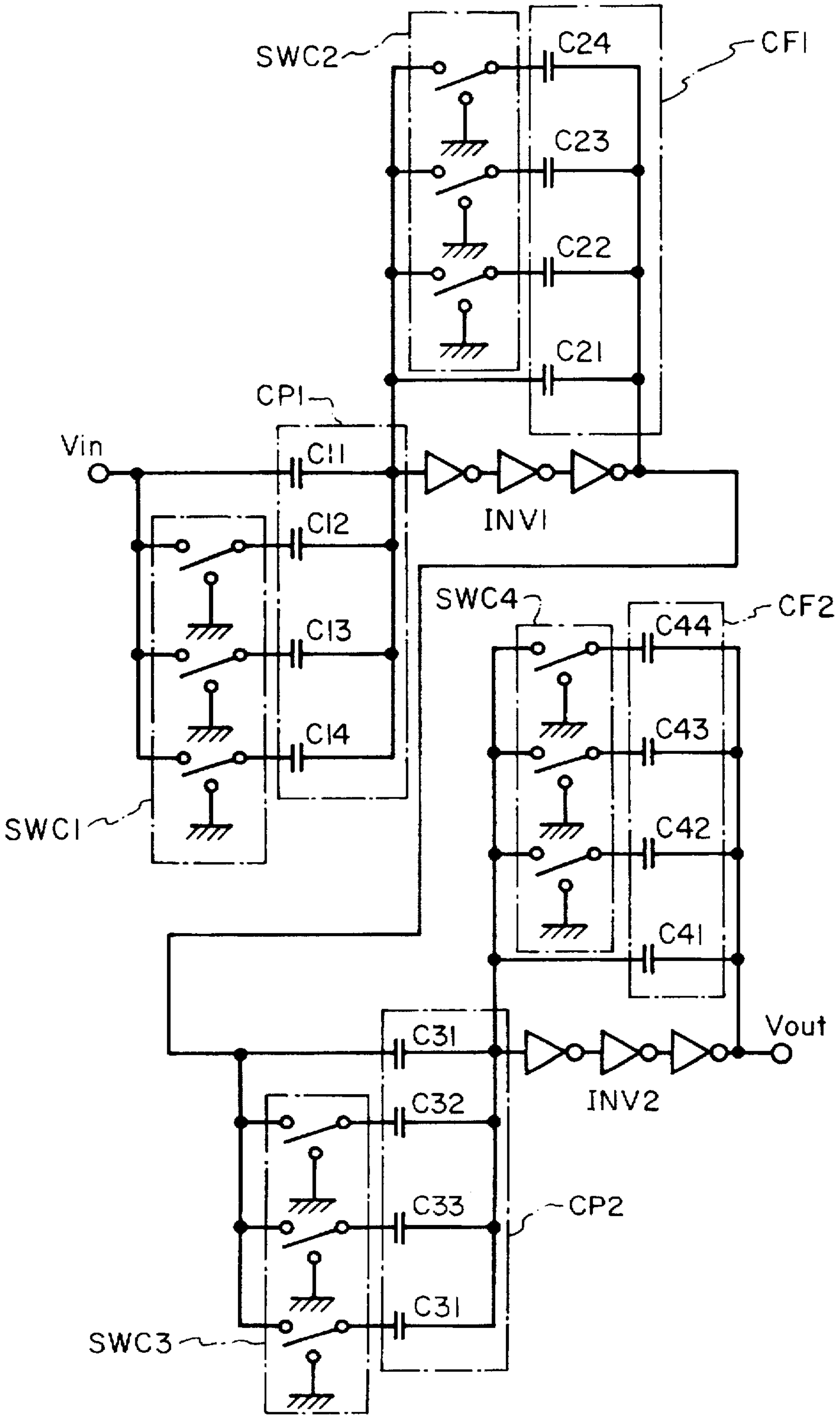
FIG. 6 (PRIOR ART)
FIG. 6 shows a conventional scaler circuit.

FIG. 5 shows a variation of the above embodiment. In the figure, the reference voltage generating circuit Vref is connected to capacitive couplings CP1 and CP2, and capacitances Cr1 and Cr2 for connecting them are omitted. Though the merit of equivalence to the multiplication circuit and the pattern commonage is lost, the circuit is simplified and the bad influence of Cr1 and Cr2 on the accuracy of operation can be avoided.

In a multiplication circuit of the present invention, capacitive couplings are connected to the first and the second inverting amplifying portion, respectively, and capacitances of the capacitive couplings are selectively connected by switches. Two steps of multiplication are realized by a circuit having almost the same size as a conventional circuit. Therefore, each capacity of the capacitances can be set smaller and the area of the circuit for forming capacitance can be reduced.

In the scaler circuit of the present invention, 1) odd number of MOS inverters are connected in serial, 2) a grounded capacitance is connected between an output of the last stage of the MOS inverters and the ground, 3) an output of the MOS inverters is connected to a supply voltage and ground by a pair of the balancing resistances, respectively, in the stage preceding the last stage of the MOS inverter, 4) a reference voltage is generated as an output of a reference voltage generating circuit, which consists of odd number of MOS inverters serially connected, an output of the last stage MOS inverter being fed back to an input of the first stage inverter, and 5) the MOS inverter of the reference voltage generating circuit and the MOS inverter of the first and the second inverting amplifying portions have and the same circuit characteristics as well as being adjacently placed on an LSI. The accuracy of the output is improved because the number of the unit capacitances is controlled due to the two stages of weighting and controlling the capacity of the first inverting amplifying portion and the second inverting amplifying portion, and the offset voltage of the MOS inverters of the reference voltage generating circuit and the inverting amplifying portion are canceled out. As the structure of the reference voltage generating circuit is similar to that of the inverting amplifying circuit, the difference between the reference voltage and the offset voltage can be controlled as the minimum.

What is claimed is:

1. A multiplication circuit comprising:

a first switching circuit having a plurality of switches each of which receives a common analog input voltage;

a first capacitive coupling having a plurality of capacitances corresponding to said switches of said first switching circuit, each capacitance in said plurality of capacitances defining said first capacitive coupling being operatively connected to a corresponding switch in said first switching circuit;

a first inverting amplifier which comprises an odd number of MOS inverters serially connected, an input of said first inverting amplifier being operatively connected to outputs of said plurality of capacitances defining said first capacitive coupling, said odd number of MOS inverters defining said first inverting amplifier including at least three MOS inverters, and an output of said first inverting amplifier being output by a last MOS inverter in said odd number of MOS inverters defining said first inverting amplifier;

a first pair of balancing resistances having first ends operatively connected to an output of one of said odd number of MOS inverters defining said first inverting amplifier other than said last MOS inverter, a first resistance in said first pair of balancing resistance having a second end operatively connected to a supply voltage and a second resistance in said first pair of balancing resistance having a second end operatively connected to ground;

a second switching circuit having a plurality of switches each of which is operatively connected to an output of said first inverting amplifier;

a second capacitive coupling having a plurality of capacitances corresponding to said switches of said second switching circuit, each capacitance in said plurality of capacitances defining said second capacitive coupling being operatively connected to a corresponding switch in said second switching circuit;

a second inverting amplifier which comprises an odd number of MOS inverters serially connected, an input of said second inverting amplifier being operatively connected to outputs of said plurality of capacitances defining said second capacitive coupling, whereby said analog input voltage is multiplied by said first and said second capacitive couplings, said odd number of MOS inverters in said second inverting amplifier including at least three MOS inverters, and an output of said second inverting amplifier being output by a last MOS inverter in said odd number of MOS inverters defining said second inverting amplifier; and a second pair of balancing resistances having first ends operatively connected to an output of one of said odd number of MOS inverters defining said second inverting amplifier other than said last MOS inverter, a first resistance in said second pair of balancing resistance having a second end operatively connected to said supply voltage and a second resistance in said second pair of balancing resistance having a second end operatively connected to ground.

2. A multiplication circuit comprising:

a first switching circuit having a plurality of switches each of which receives said analog input voltage;

a first capacitive coupling having a plurality of capacitances corresponding to said switches of said first switching circuit, each capacitance in said plurality of capacitances defining said first capacitive coupling being operatively connected to a corresponding switch in said first switching circuit;

a first inverting amplifier which comprises an odd number of MOS inverters serially connected, an input of said first inverting amplifier being operatively connected to outputs of said plurality of capacitances defining said first capacitive coupling;

a second switching circuit having a pluralitv of switches each of which is operatively connected to an output of said first inverting amplifier;

a second capacitive coupling having a plurality of capacitances corresponding to said switches of said second switching circuit, each capacitance in said plurality of capacitances defining said second capacitive coupling being operatively connected to a corresponding switch in said second switching circuit;

a second inverting amplifier which comprises an odd number of MOS inverters serially connected, an input of said second inverting amplifier being operatively connected to outputs of said plurality of capacitances defining said second capacitive coupling, whereby said analog input voltage is multiplied by said first and said second capacitive couplings;

a first grounded capacitance operatively connected between said output of said first inverting amplifier and ground;

a second grounded capacitance operatively connected between an output of said second inverting amplifier and ground;

a first equilibrium resistance having first and second resistances having first ends operatively connected to an output of a MOS inverter in said first inverting amplifier other than a last of said MOS inverters defining said first inverting amplifier, said first resistance in said first equilibrium resistance having a second end operatively connected to a supply voltage, said second resistance in said first equilibrium resistance having a second end operatively connected to ground;

a second equilibrium resistance having first and second resistances having first ends operatively connected to an output of a MOS inverter in said second inverting amplifier other than a last of said MOS inverters defining said second inverting amplifier, said first resistance in said second equilibrium resistance having a second end operatively connected to said supply voltage, said second resistance in said second equilibrium resistance having a second end operatively connected to ground;

a first feedback capacitance connecting said output and input of said first inverting amplifier; and a second feedback capacitance connecting said output and input of said second inverting amplifier.

3. A multiplication circuit as claimed in claim 1, wherein each of said first and said second capacitive couplings have capacities corresponding to weights of digits of a binary number.

4. A multiplication circuit comprising:

a first switching circuit having a plurality of switches each of which receives said analog input voltage;

a first capacitive coupling having a plurality of capacitances corresponding to said switches of said first switching circuit, each capacitance in said plurality of capacitances defining said first capacitive coupling being operatively connected to a corresponding switch in said first switching circuit;

a first inverting amplifier which comprises an odd number of MOS inverters serially connected, an input of said first inverting amplifier being connected to outputs of said plurality of capacitances defining said first capacitive coupling;

a second switching circuit having a plurality of switches each of which is operatively connected to an output of said first inverting amplifier;

a second capacitive coupling having a plurality of capacitances corresponding to said switches of said second switching circuit, each capacitance in said plurality of capacitances defining said second capacitive coupling being operatively connected to a corresponding switch in said second switching circuit; and a second inverting amplifier which comprises an odd number of MOS inverters serially connected, an input of said second inverting amplifier being operatively connected to outputs of said plurality of capacitances defining said second capacitive coupling, whereby said analog input voltage is multiplied by said first and said second capacitive couplings, wherein each of said first and said second capacitive couplings have capacities corresponding to weights of digits of a binary number, and wherein each said first and said second capacitive couplings further comprises an additional capacitance corresponding to a least significant bit of said binary number, an input of said additional capacitance being operatively connected to ground.

5. A multiplication circuit as claimed in claim 2, wherein said first and said second feedback capacitances have capacities equal to total capacities of said first and said second capacitive couplings, respectively.

6. A scalar circuit comprising:

a first switching circuit having a plurality of switches, each switch in said first switching circuit having an input which is alternatively operatively connected to one of an analog input voltage and a reference voltage;

a first capacitive coupling having a plurality of capacitances corresponding to said switches of said first switching circuit, each capacitance in said plurality of capacitances defining said first capacitive coupling being operatively connected to an output of a corresponding switch in said first switching circuit;

a first inverting amplifier which comprises an odd number of MOS inverters serially connected, an input of said first inverting amplifier being operatively connected to outputs of said plurality of capacitances defining said first capacitive coupling;

a first group of feedback capacitances operatively connected to said outputs of said plurality of capacitances defining said first capacitive coupling;

a second switching circuit having a plurality of switches each switch in said second switching circuit having a first terminal operatively connected to a feedback capacitance in said first group of feedback capacitiances and a second terminal alternatively operatively connected to one of an output of said first inverting amplifier and said reference voltage;

a third switching circuit having a plurality of switches, each switch in said third switching circuit having a first terminal that is alternatively operatively connected to one of said output of said first inverting amplifier and said reference voltage;

a second capacitive coupling having a plurality of capacitances corresponding to said switches of said third switching circuit, each capacitance in said plurality of capacitances in said second capacitive coupling being operatively connected to a second terminal in a corresponding switch in said third switching circuit;

a second inverting amplifier which comprises an odd number of MOS inverters serially connected, an input of said second inverting amplifier being operatively connected to outputs of said plurality of capacitances defining said second capacitive coupling;

a second group of feedback capacitances operatively connected to said outputs of said plurality of capacitances defining said second capacitive coupling;

a fourth switching circuit having a plurality of switches, each switch in said fourth switching circuit having a first terminal operatively connected to a feedback capacitance in said second group of feedback capacitiances and a second terminal alternatively operatively connected to one of an output of said second inverting amplifier and said reference voltage; and a reference voltage generating circuit for generating said reference voltage which comprises:

a) odd number of MOS inverters serially connected and disposed adjacent to said MOS inverters of said first and said second inverting amplifiers, b) a grounded capacitance operatively connected between an output of a last MOS inverter in said odd number of inverters in said reference voltage generating circuit and ground, c) an equilibrium resistance having a first resistance and a second resistance, said first resistance being operatively connected between an output of a MOS inverter in said odd number of MOS inverters in said reference voltage generating circuit other than said last MOS inverter and a supply voltage, said second resistance being operatively connected between said output of a MOS inverter in said odd number of MOS inverters in said reference voltage generating circuit other than said last MOS inverter and ground, and d) a feedback line operatively connecting said output of said last MOS inverter in said odd number of inverters in said reference voltage generating circuit to an input of a first MOS inverter in said odd number of inverters in said reference voltage generating circuit.

7. A scaler circuit as claimed in claim 6, further comprising:

grounded capacitances connected between an output of said first inverting amplifier and ground and between an output of said second inverting amplifier and ground;

a first equilibrium resistance having a first resistance and a second resistance, said first resistance in said first equilibrium resistance being connected between an output of one of said MOS inverters defining said first inverting amplifier other than a last MOS inverter of said first inverting amplifier and a supply voltage, said second resistance in said first equilibrium resistance being connected between said output of one of said MOS inverters defining said first inverting amplifier other than said last MOS inverter of said first inverting amplifier and ground; and a second equilibrium resistance having a first resistance and a second resistance, said first resistance in said second equilibrium resistance being connected between an output of one of said MOS inverters defining said second inverting amplifier other than a last MOS inverter of said second inverting amplifier and a supply voltage, said second resistance in said second equilibrium resistance being connected between said output of one of said MOS inverters defining said second inverting amplifier other than said last MOS inverter of said second inverting amplifier and ground.

8. A scaler circuit as claimed in claim 6, wherein said reference voltage is a half of said supply voltage.

9. A scaler circuit as claimed in claim 6, further comprising refreshing switches operatively connecting said input and said output of said first and second inverting amplifiers, respectively.

* * * * *